United States Patent [19]

Hurter

[11] Patent Number: 5,332,806
[45] Date of Patent: Jul. 26, 1994

[54] DISAZO DYES WHICH CONTAIN 2-HYDROXYNAPHTHYL MOIETY

[75] Inventor: Rudolf Hurter, Basel, Switzerland

[73] Assignee: Ciba-Geigy Corporation, Ardsley, N.Y.

[21] Appl. No.: 989,735

[22] Filed: Dec. 10, 1992

Related U.S. Application Data

[63] Continuation of Ser. No. 793,057, Nov. 18, 1991, abandoned, which is a continuation-in-part of Ser. No. 700,003, May 14, 1991, abandoned.

[30] Foreign Application Priority Data

May 18, 1990 [CH] Switzerland .................... 1700/90-7

[51] Int. Cl.$^5$ ............................................. C09B 31/02
[52] U.S. Cl. .................... 534/834; 534/831; 534/832; 534/835; 534/836; 534/837
[58] Field of Search ............... 534/670, 671, 673, 831, 534/832, 834, 835, 836, 837

[56] References Cited

U.S. PATENT DOCUMENTS

| | | |
|---|---|---|
| 3,034,848 | 5/1962 | King . |
| 3,615,581 | 10/1971 | Kabitzke et al. . |
| 3,623,874 | 11/1971 | Froehlich . |
| 3,634,091 | 1/1972 | Loeffel et al. . |
| 3,951,944 | 4/1976 | Nickel et al. ............... 260/186 |
| 3,960,831 | 6/1976 | Fuchs ................................ 260/86 |

FOREIGN PATENT DOCUMENTS 152765 8/1985 European Pat. Off. .
1923680 11/1970 Fed. Rep. of Germany .

OTHER PUBLICATIONS

Chem. Abstracts:PCA 72(2):4343y, "Disazo dyes for the silver bleach process". Kabitzke et al. (Belg. BE715411 Nov. 20, 1968) (1968).
CA 74(24):127563u (1970) Loeffel et al.
CA 73(8):36607z (1969) Froehlich.

*Primary Examiner*—Howard T. Mars
*Assistant Examiner*—John Peabody
*Attorney, Agent, or Firm*—Kevin T. Mansfield; Edward McC. Roberts

[57] ABSTRACT

Azo dyes of the formula

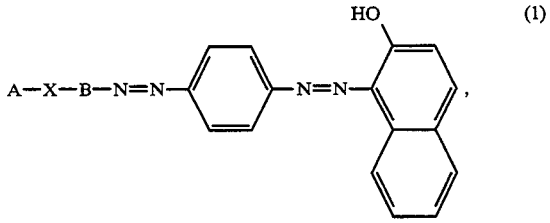

where A and B are each independently of the other substituted or unsubstituted phenyl or naphthyl and X is $-N(R_1)-SO_2-$, $-O-SO_2-$ or $-SO_2-N(R_1)-$, where $R_1$ is hydrogen or $C_1-C_8$alkyl, produce very fast dyeings on nitrogen-containing or hydroxyl-containing fibre materials, paper or leather.

14 Claims, No Drawings

DISAZO DYES WHICH CONTAIN 2-HYDROXYNAPHTHYL MOIETY

This application is a continuation, of application Ser. No. 07/793,057, filed Nov. 18, 1991 and now abandon which is a continuation-in-part of Ser. No. 07/700,003 filed May 14, 1991, now abandoned.

The present invention relates to novel azo dyes, processes for preparing them and the use of these dyes for dyeing and printing fibre materials, in particular textile fibre materials.

The present invention accordingly provides azo dyes of the formula

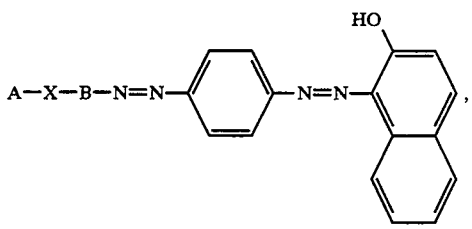

where A and B are each independently of the other substituted or unsubstituted phenyl or naphthyl and X is —N(R$_1$)—SO$_2$—, —O—SO$_2$— or —SO$_2$—N(R$_1$)—, where R$_1$ is hydrogen or C$_1$–C$_8$alkyl.

Suitable substituents for the radicals A and B are independently of one another for example alkyl groups of from 1 to 8, preferably from 1 to 4, carbon atoms, e.g. methyl, ethyl, propyl, isopropyl, butyl, isobutyl, sec-butyl, tert-butyl, pentyl, hexyl, heptyl or octyl, alkoxy groups of from 1 to 8 carbon atoms, in particular of from 1 to 4 carbon atoms, e.g. methoxy, ethoxy, propoxy, isopropoxy or butoxy, acylamino groups such as alkanoylamino groups of from 2 to 8 carbon atoms and alkoxycarbonylamino groups of from 2 to 8 carbon atoms, e.g. acetylamino, propionylamino, methoxycarbonylamino or ethoxycarbonylamino, alkanoyl groups of from 2 to 8, preferably from 2 to 4, carbon atoms, e.g. acetyl, propionyl, butyryl or isobutyryl, unsubstituted or C$_1$–C$_8$alkyl-, C$_1$–C$_8$alkoxy-, halogeno-, carboxyl- or sulfo-substituted phenylaminosulfonyl or naphthylaminosulfonyl, nitro, cyano, trifluoromethyl, halogen, such as fluorine, bromine or in particular chlorine, carbamoyl, sulfamoyl, ureido, hydroxyl, carboxyl, sulfo or sulfato.

A C$_1$–C$_8$alkyl R$_1$ in formula (1) may be for example methyl, ethyl, propyl, isopropyl, butyl, isobutyl, sec-butyl, tert-butyl, pentyl, hexyl, heptyl or octyl.

The meanings specified for X under formula (1) should be read from left to right and are to be understood in that form as meanings of X in the formula (1).

Preference is given to azo dyes of the formula (1) where R$_1$ is hydrogen or C$_1$–C$_4$alkyl, in particular methyl.

Preference is likewise given to azo dyes of the formula (1) where A and B are each independently of the other phenyl or naphthyl which may each be substituted by C$_1$–C$_8$alkyl, C$_1$–C$_8$alkoxy, halogen, carboxyl, sulfo or a phenylaminosulfonyl or naphthylaminosulfonyl radical which may in turn be further substituted by C$_1$–C$_8$alkyl, C$_1$–C$_8$alkoxy, halogen, carboxyl or sulfo, preferably sulfo, in particular where A and B are each independently of the other unsubstituted or C$_1$–C$_8$alkyl-, C$_1$–C$_8$alkoxy-, halogen-, carboxyl- or sulfo-substituted phenyl or naphthyl.

Preference is further given to azo dyes of the formula (1) where A is phenyl which may be substituted by C$_1$–C$_4$alkyl, C$_1$–C$_4$alkoxy, halogen, carboxyl, sulfo or a phenylaminosulfonyl or naphthylaminosulfonyl radical which may in turn be further substituted by C$_1$–C$_8$alkyl, C$_1$–C$_8$alkoxy, halogen, carboxyl or sulfo.

Preference is further given to azo dyes of the formula (1) where B is unsubstituted or C$_1$–C$_4$alkyl-, C$_1$–C$_4$alkoxy-, halogen-, carboxyl- or sulfo-substituted phenyl.

Preferably, in the azo dyes of the formula (1), A is phenyl which may be substituted by C$_1$–C$_4$alkyl, C$_1$–C$_4$alkoxy, halogen, carboxyl, sulfo or a phenylaminosulfonyl or naphthylaminosulfonyl radical which may in turn be further substituted by C$_1$–C$_8$alkyl, C$_1$–C$_8$alkoxy, halogen, carboxyl or sulfo, and B is unsubstituted or C$_1$–C$_4$alkyl-, C$_1$–C$_4$alkoxy-, halogen-, carboxyl- or sulfo-substituted phenyl.

The azo dyes of the formula (1) preferably contain only one or two sulfo groups, in particular only one sulfo group.

Preference is likewise given to azo dyes of the formula (1) where X is —N(R$_1$)—SO$_2$—, —O—SO$_2$— or —SO$_2$—NH—, preferably where X is —N(R$_1$)—SO$_2$—, and R$_1$ is hydrogen or C$_1$–C$_4$alkyl, in particular hydrogen.

Of interest are azo dyes of the formula (1) where A and B are each independently of the other unsubstituted or C$_1$–C$_4$alkyl-, C$_1$–C$_4$alkoxy-, halogen-, carboxyl- or sulfo-substituted phenyl or naphthyl, X is —N(R$_1$)—SO$_2$—and R$_1$ is hydrogen or C$_1$–C$_4$alkyl, in particular hydrogen, and the azo dyes of the formula (1) contain only one or two sulfo groups, in particular only one sulfo group.

Particular preference is given to azo dyes of the formula

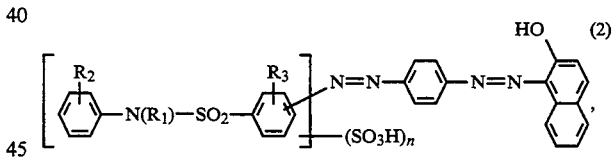

where R$_1$ is hydrogen or C$_1$–C$_4$alkyl, in particular hydrogen, R$_2$ is hydrogen, C$_1$–C$_4$alkyl, C$_1$–C$_4$alkoxy, halogen, carboxyl or unsubstituted or sulfo-substituted phenylaminosulfonyl or naphthylaminosulfonyl, R$_3$ is hydrogen, C$_1$–C$_4$alkyl, C$_1$–C$_4$alkoxy, halogen or carboxyl, and n is 1 or 2.

Very particular preference is given to azo dyes of the formula

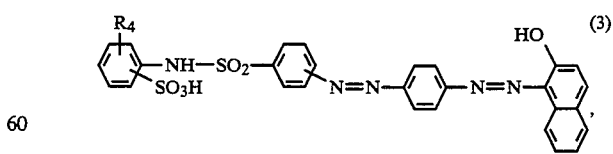

where R$_4$ is hydrogen or methyl, in particular hydrogen.

The present invention further provides dye mixtures which contain at least two azo dyes of the formula (1) which are subject to the above definitions and expressions of preferences.

The present invention further provides dye mixtures which contain an azo dye of the formula

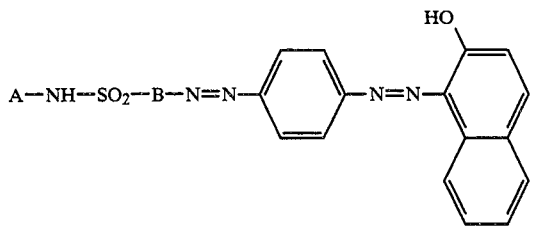

and at least one of the dyes of formulae

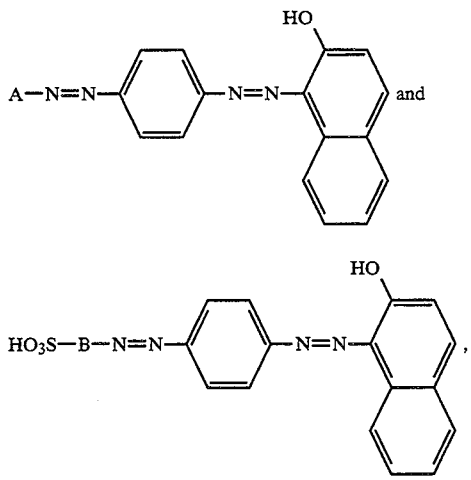

where A and B are each independently of the other substituted or unsubstituted phenyl or naphthyl. As to the definitions of A and B the same preferences apply as given hereinbefore.

The present invention further provides a process for preparing the azo dyes of the formula (1), which comprises diazotising an amine of the formula

A—X—B—NH$_2$     (4), where A, B and X are each as defined for the formula (1), coupling the diazonium salt with a compound of the formula

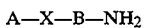

where R$_5$ is hydrogen or —CH$_2$—SO$_3$H, converting the resulting product if R$_5$ is —CH$_2$—SO$_3$H to the compound of the formula

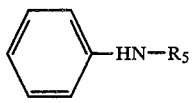

diazotising the compound of the formula (6) and coupling the diazonium salt with a compound of the formula

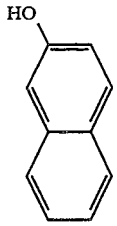

Mixtures of dyes of the formula (1) can be prepared for example by mixed synthesis, which consists in proceeding as above but using at least two compounds of the formula (4).

The compounds of the formulae (4) and (6) are each diazotised in a conventional manner, for example with a nitrite, e.g. an alkali metal nitrite such as sodium nitrite, in a medium acidified with a mineral acid, for example hydrochloric acid, at temperatures of for example from −5° to 30° C., preferably at from 0° to 10° C.

The couplings with the coupling components of the formulae (5) and (7) are each effected in a conventional manner, at an acidic, neutral or alkaline pH and at temperatures of for example from −5° to 30° C., preferably at from 0° to 15° C.

The conversion of the reaction product obtained from the coupling of the compound of the formula (4) with the compound of the formula (5) into a compound of the formula (6) is necessary only on using a compound of the formula (5) where R$_5$ is —CH$_2$—SO$_3$H. In this case, the conversion is effected in the presence of a base, e.g. sodium hydroxide, at a temperature of for example from 40° to 100° C., in particular at a temperature of from 80° to 100° C.

An alkyl R$_1$ can also be introduced after the preparation of the dye of the formula (1), for example by alkylation with a dialkyl sulfate, a dialkyl carbonate, a dialkyl methanephosphonate or a methyl toluenesulfonate derivative, in aqueous solution in a manner known per se.

Alternatively, dyes of the formula (1) where X is —N(R$_1$)—SO$_2$— may be prepared by reacting a compound of the formula

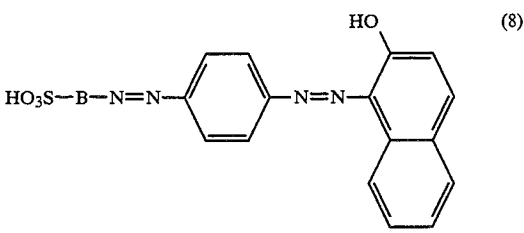

with a halogenating agent to give a compound of the formula

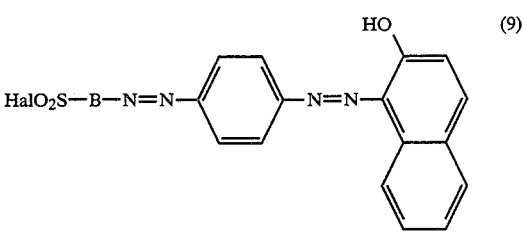

and then reacting the compound of the formula (9) with a compound of the formula

  (10), where A, B and $R_1$ are each as defined for the formula (1) and Hal is halogen, in particular chlorine.

The reaction of the compound of the formula (8) with a halogenating agent, for example thionyl chloride or sulfuryl chloride, to give a compound of the formula (9) is carried out in an organic solvent, for example sulfolane, dimethyl sulfoxide or dimethylformamide, in a manner known per se. The reaction of the compound of the formula (9) with a compound of the formula (10) is effected in a conventional manner.

Preferred embodiments of the process of the present invention comprise using a compound of the formula (4) where $R_1$ is hydrogen or $C_1$–$C_4$alkyl, in particular methyl;

a compound of the formula (4) where A and B are each independently of the other phenyl or naphthyl which may each be substituted by $C_1$–$C_8$alkyl, $C_1$–$C_8$alkoxy, halogen, carboxyl, sulfo or a phenylaminosulfonyl or naphthylaminosulfonyl radical which may in turn be further substituted by $C_1$–$C_8$alkyl, $C_1$–$C_8$alkoxy, halogen, carboxyl or sulfo;

a compound of the formula (4) where A is phenyl which may be substituted by $C_1$–$C_4$alkyl, $C_1$–$C_4$alkoxy, halogen, carboxyl, sulfo or a phenylaminosulfonyl or naphthylaminosulfonyl radical which may in turn be further substituted by $C_1$–$C_8$alkyl, $C_1$–$C_8$alkoxy, halogen, carboxyl or sulfo;

a compound of the formula (4) where B is unsubstituted or $C_1$–$C_4$alkyl-, $C_1$–$C_4$alkoxy-, halogen-, carboxyl- or sulfo-substituted phenyl;

a compound of the formula (4) which contains only one or two sulfo groups, in particular only one sulfo group;

a compound of the formula (4) where X is —N($R_1$)—$SO_2$— and $R_1$ is hydrogen or $C_1$–$C_4$alkyl, in particular hydrogen;

a compound of the formula (5) where $R_5$ is —$CH_2$—$SO_3H$ and converting the reaction product obtained from the coupling of the compound of the formula (4) with the compound of the formula (5) into a compound of the formula (6).

Preferably, A and B in the compound of the formula (4) are each phenyl which may be substituted by $C_1$–$C_4$alkyl, $C_1$–$C_4$alkoxy, halogen, carboxyl or sulfo, in particular by methyl, methoxy, chlorine, carboxyl or sulfo.

An interesting embodiment of the process of the present invention comprises coupling a compound of the formula (4) where A and B are each independently of the other unsubstituted or $C_1$–$C_4$alkyl-, $C_1$–$C_4$alkoxy-, halogen-, carboxyl- or sulfo-substituted phenyl or naphthyl, X is —N($R_1$)—$SO_2$— and $R_1$ is hydrogen or $C_1$–$C_4$alkyl, in particular hydrogen, and the compound of the formula (4) contains only one or two sulfo groups, in particular only one sulfo group, with a compound of the formula (5) where $R_5$ is —$CH_2$—$SO_3H$.

A particularly preferred embodiment of the process of the present invention comprises coupling a compound of the formula

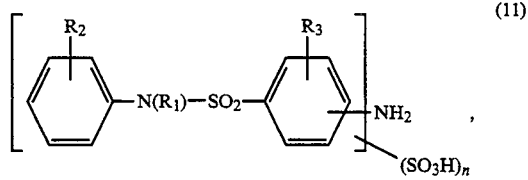  (11)

where $R_1$, $R_2$, $R_3$ and n are each as defined for the formula (2), with a compound of the formula

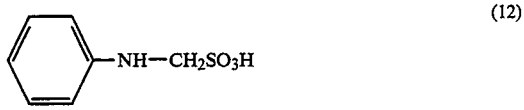  (12)

A very particularly preferred embodiment of the process of the present invention comprises coupling a compound of the formula

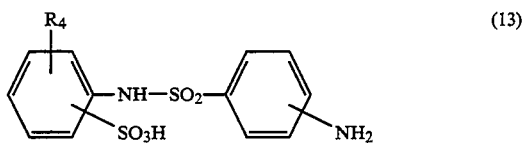  (13)

where $R_4$ is as defined for the formula (3), with a compound of the formula (12).

Dye mixtures which contain an azo dye of the formula

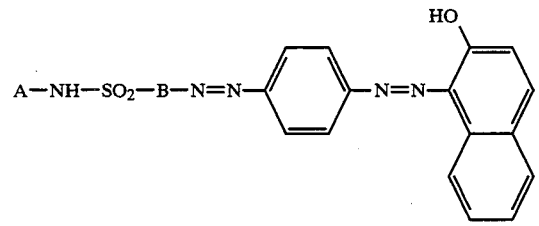

and at least one of the dyes of formulae

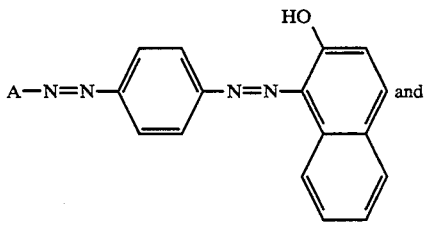 and

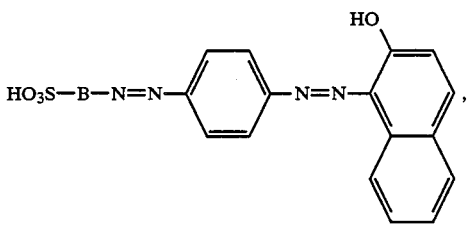, for example can be obtained by reacting a compound of formula

  (14)

with a compound of formula

NO$_2$—B—SO$_2$—Hal    (15), and reducing the reaction product obtained. The following steps are the same as those given hereinbefore for the preparation of the azo dyes of the formula (1), wherein the above reaction product obtained after reduction is used instead of the amine of formula (4).

For A and B the same meanings and preferences apply as given hereinbefore. In formula (15) Hal is halogen, preferably chlorine.

The reaction of the compounds of formlae (14) and (15) is carried out in a conventional manner, for example in water as a solvent and at a pH of from 3 to 7.

The reduction is carried out in a conventional manner, for example in the presence of iron powder, in aqueous medium at a temperature of preferably 90° to 100° C., most preferably the reduction is carried out at the boil.

The amines of the formula (4) and the compounds of the formula (5), (14) and (15) are known per se or can be prepared similarly to known compounds.

The dyes of the formula (1) are present either in the form of their free acid or preferably as salts thereof.

Suitable salts are for example the alkali metal or ammonium salts or the salts of an organic amine.

Examples are sodium, lithium, potassium and ammonium salts and the salts of mono-, di-or triethanolamine.

The azo dyes of the formula (1) and the mixtures of dyes of the present invention are suitable for dyeing and printing in a conventional manner, in particular nitrogen-containing or hydroxyl-containing fibre materials, paper or leather, for example textile fibre materials made of cellulose, silk and in particular wool and synthetic polyamides. The azo dyes of the formula (1) and the mixtures of dyes of the present invention can be used for dyeing or printing in a generally customary, possibly pretreated form. Level dyeings are obtained in red shades having good all round fastness properties, in particular good rub, wet, wet rub and light fastness. Furthermore, the dyes and the mixtures of dyes of the present invention are very readily water-soluble. Moreover, the dyes of the present invention and the mixtures of dyes have very good build-up properties and are very highly compatible with other dyes. The abovementioned textile material can be present in a wide range of forms, for example as fibre, yarn, woven fabric or knitted fabric.

In the examples which follow, parts are by weight. The temperatures are in degrees Celsius. Parts by weight bear the same relation to parts by volume as the gram to the cubic centimetre.

EXAMPLE 1

The first step comprises preparing a mixture of 41 parts of 41% aqueous sodium bisulfite solution and 13 parts of 37% aqueous formaldehyde solution, stirring for a short time and adding 13.95 parts of aniline at 65°. Gradually a clear solution forms, which forms a crystalline solid on cooling down in the course of 2 hours. The reaction mixture is then diluted with 140 parts of water, heated to 60° and stirred until a clear solution is formed. Ice is added to cool down to 5°, followed by 16.8 parts of sodium bicarbonate.

In a second step, 49.2 parts of a compound which in the form of the free acid conforms to the formula

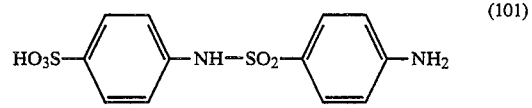    (101)

are dissolved in a separate reaction flask in 150 parts of water at pH 7.5 with concentrated aqueous sodium hydroxide solution, and 37.5 parts of 4N sodium nitrite solution are then added. The reaction mixture is added dropwise to a mixture of 150 parts of ice and 37.5 parts of approximately 32% hydrochloric acid solution. The diazo suspension thus obtained is added to the solution obtained in the first step. After some hours, 190 parts of sodium chloride are added and the reaction product is then filtered off. 180 parts are obtained of a still moist reaction product which in the form of the free acid corresponds to the compound of the formula

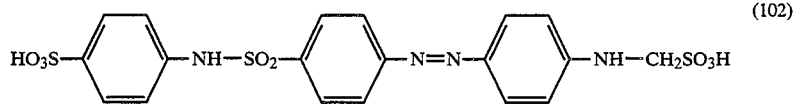    (102)

180 parts of the compound of the formula (102) obtained as described above are then added to 450 parts of a 7% aqueous sodium hydroxide solution and the mixture is heated at the boil for 2 to 3 hours. After cooling down to room temperature, a pH of about 0.5 is set with approximately 32% of hydrochloric acid solution. The precipitated product is filtered off, washed with water and dried under reduced pressure at a temperature of from 50° to 60°. This leaves 43.9 parts of a reaction product which in the form of the free acid corresponds to the compound of the formula

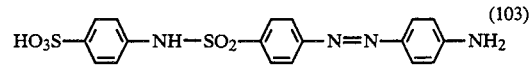    (103)

4.32 parts of the compound of the formula (103) obtained as described above are dissolved in 50 parts of water at pH 7.5 with dilute aqueous sodium hydroxide solution, and 2.5 parts of 4N aqueous sodium nitrite solution are added. The mobile suspension is heated to 55° and added dropwise to a mixture of 50 parts of ice and 2.5 parts of approximately 32% hydrochloric acid solution. The reaction mixture is then stirred for 30 minutes and added at about pH 8.5 and a temperature of from 2° to 5° to a solution prepared beforehand by dissolving 1.44 parts of 2-naphthol in 100 parts of warm water in the presence of 5 parts of 2N aqueous sodium hydroxide solution and 1.06 parts of sodium carbonate and then cooling to a temperature of 2°. After the coupling has ended, the reaction mixture thus obtained is admixed with 18 parts of sodium chloride, and the precipitated dye is filtered off, washed with dilute aqueous sodium chloride solution and ice-water and dried under reduced pressure at a temperature of from 50° to 60°. This leaves 3.8 parts of a dye which in the form of the free acid corresponds to the compound of the formula

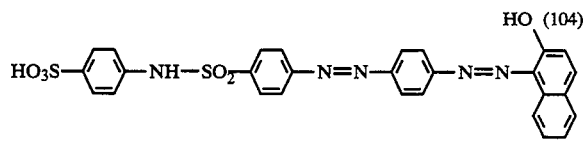

The dye of the formula (104) dyes natural and synthetic polyamide in red shades.

EXAMPLES 2 to 101

The procedure described in Example 1 is repeated, except that the 49.2 parts of the compound of the formula (101) are replaced by one of the amines shown below in column 2 of the table in the form of the free acid, affording similar dyes which dye natural and synthetic polyamide in red shades.

TABLE

| Ex. | Amine | |
|---|---|---|
| 2 | [structure] | (105) |
| 3 | [structure] | (106) |
| 4 | [structure] | (107) |
| 5 | [structure] | (108) |
| 6 | [structure] | (109) |
| 7 | [structure] | (110) |
| 8 | [structure] | (111) |
| 9 | [structure] | (112) |
| 10 | [structure] | (113) |
| 11 | [structure] | (114) |
| 12 | [structure] | (115) |
| 13 | [structure] | (116) |
| 14 | [structure] | (117) |
| 15 | [structure] | (118) |
| 16 | [structure] | (119) |
| 17 | [structure] | (120) |
| 18 | [structure] | (121) |
| 19 | [structure] | (122) |
| 20 | [structure] | (123) |
| 21 | [structure] | (124) |
| 22 | [structure] | (125) |
| 23 | [structure] | (126) |

| Ex. | Amine | |
|---|---|---|
| 24 | 6-[N-methyl-N-(3-aminophenylsulfonyl)amino]naphthalene-1,3-disulfonic acid structure (HO₃S-naphthalene-N(CH₃)-SO₂-C₆H₄-NH₂, with SO₃H) | (127) |
| 25 | 6-[N-methyl-N-(6-amino-2-naphthylsulfonyl)amino]naphthalene-1,3-disulfonic acid structure | (128) |
| 26 | 4-methyl-2-sulfo-N-(6-amino-2-naphthylsulfonyl)aniline | (129) |
| 27 | 4-methyl-2-sulfo-N-(3-aminophenylsulfonyl)aniline | (130) |
| 28 | 4-methyl-2-sulfo-N-(4-aminophenylsulfonyl)aniline | (131) |
| 29 | 2-methyl-4-sulfo-N-(4-aminophenylsulfonyl)aniline | (132) |
| 30 | 2-methyl-4-sulfo-N-(3-aminophenylsulfonyl)aniline | (133) |
| 31 | 4-methyl-3-sulfo-N-(3-aminophenylsulfonyl)aniline | (134) |
| 32 | 4-methoxy-2-sulfo-N-(4-aminophenylsulfonyl)aniline | (135) |
| 33 | 4-methoxy-2-sulfo-N-(3-aminophenylsulfonyl)aniline | (136) |
| 34 | 2-chloro-4-sulfo-N-(3-aminophenylsulfonyl)aniline | (137) |
| 35 | 2-chloro-4-sulfo-N-(4-aminophenylsulfonyl)aniline | (138) |
| 36 | 4-chloro-3-sulfo-N-(4-aminophenylsulfonyl)aniline | (139) |
| 37 | 2-carboxy-4-sulfo-N-(4-aminophenylsulfonyl)aniline | (140) |
| 38 | 2-carboxy-4-sulfo-N-(6-amino-2-naphthylsulfonyl)aniline | (141) |
| 39 | 2,4-dimethyl-6-sulfo-N-(3-aminophenylsulfonyl)aniline | (142) |
| 40 | 2-methoxy-4-methyl-5-sulfo-N-(3-aminophenylsulfonyl)aniline | (143) |
| 41 | 2-methoxy-4-methyl-5-sulfo-N-(4-aminophenylsulfonyl)aniline | (144) |
| 42 | 4-chloro-6-methyl-2-sulfo-N-(4-aminophenylsulfonyl)aniline | (145) |
| 43 | 4-chloro-5-methyl-2-sulfo-N-(4-aminophenylsulfonyl)aniline | (146) |
| 44 | 2,5-dichloro-4-sulfo-N-(4-aminophenylsulfonyl)aniline | (147) |
| 45 | 2,5-dichloro-4-sulfo-N-(3-aminophenylsulfonyl)aniline | (148) |
| 46 | 2-methyl-4-sulfo-N-(5-amino-2-methylphenylsulfonyl)aniline | (149) |
| 47 | 4-sulfo-N-(5-amino-2-methylphenylsulfonyl)aniline | (150) |
| 48 | 3-sulfo-N-(5-amino-2-methylphenylsulfonyl)aniline | (151) |

| Ex. | Amine | |
|---|---|---|
| 49 | 3-HO₃S-C₆H₄-NH-SO₂-C₆H₃(NH₂)(Cl) | (152) |
| 50 | 4-HO₃S-C₆H₄-NH-SO₂-C₆H₃(NH₂)(Cl) | (153) |
| 51 | 4-HO₃S-C₆H₄-NH-SO₂-C₆H₂(NH₂)(CH₃)₂ | (154) |
| 52 | 4-HO₃S-C₆H₄-O-SO₂-C₆H₄-NH₂ | (155) |
| 53 | 4-HO₃S-C₆H₄-O-SO₂-C₆H₄-NH₂ (3-NH₂) | (156) |
| 54 | 4-HO₃S-C₆H₄-O-SO₂-C₆H₃(NH₂)(CH₃) | (157) |
| 55 | 4-HO₃S-C₆H₄-O-SO₂-C₆H₃(NH₂)(Cl) | (158) |
| 56 | 6-HO₃S-naphthyl-O-SO₂-C₆H₄-NH₂ | (159) |
| 57 | (SO₃H)₂-naphthyl-O-SO₂-C₆H₄-NH₂ | (160) |
| 58 | C₆H₅-SO₂-NH-C₆H₃(NH₂)(SO₃H) | (161) |
| 59 | 4-CH₃-C₆H₄-SO₂-NH-C₆H₃(NH₂)(SO₃H) | (162) |
| 60 | C₆H₅-SO₂-NH-C₆H₃(SO₃H)(NH₂) | (163) |
| 61 | 4-CH₃-C₆H₄-SO₂-NH-C₆H₃(SO₃H)(NH₂) | (164) |
| 62 | 3-HO₃S-C₆H₃(Cl)-NH-SO₂-C₆H₄-NH₂ | (165) |
| 63 | 2-HO₃S-C₆H₃(Cl)-NH-SO₂-C₆H₄-NH₂ | (166) |
| 64 | HO₃S-C₆H₃(Cl)-NH-SO₂-C₆H₄-NH₂ | (167) |
| 65 | 4-HO₃S-C₆H₄-N(CH₃)-SO₂-C₆H₄-NH₂ | (168) |
| 66 | 3-HO₃S-C₆H₄-N(CH₃)-SO₂-C₆H₄-NH₂ | (169) |
| 67 | 4-HO₃S-C₆H₄-N(CH₃)-SO₂-C₆H₄-NH₂ | (170) |
| 68 | 4-HO₃S-C₆H₄-N(C₂H₅)-SO₂-C₆H₄-NH₂ | (171) |
| 69 | naphthyl(SO₃H)₂-N(CH₃)-SO₂-C₆H₄-NH₂ | (172) |
| 70 | naphthyl(SO₃H)₂-N(CH₃)-SO₂-C₆H₄-NH₂ | (173) |
| 71 | naphthyl(SO₃H)₂-N(CH₃)-SO₂-C₆H₄-NH₂ | (174) |
| 72 | naphthyl(SO₃H)₂-N(CH₃)-SO₂-C₆H₄-NH₂ | (175) |
| 73 | naphthyl(SO₃H)₂-N(CH₃)-SO₂-C₆H₄-NH₂ | (176) |
| 74 | naphthyl(SO₃H)₂-N(CH₃)-SO₂-C₆H₄-NH₂ | (177) |

TABLE-continued

| Ex. | Amine | |
|---|---|---|
| 75 | 4-chloro-N-methyl-N-(3-aminophenylsulfonyl)aniline-sulfonic acid structure | (178) |
| 76 | 4-chloro-N-methyl-N-(4-aminophenylsulfonyl)aniline-sulfonic acid structure | (179) |
| 77 | HO₃S—C₆H₄—NH—SO₂—C₆H₄—NH—SO₂—C₆H₄—NH₂ | (180) |
| 78 | HO₃S—C₆H₄—NH—SO₂—C₆H₄—NH—SO₂—C₆H₄(3-NH₂) | (181) |
| 79 | 2,5-disulfo-phenyl—NH—SO₂—C₆H₄—NH—SO₂—C₆H₄—NH₂ | (182) |
| 80 | 1,5-disulfo-naphthalen-2-yl—NH—SO₂—C₆H₄—NH—SO₂—C₆H₄—NH₂ | (183) |
| 81 | HO₃S—C₆H₄—NH—SO₂—C₆H₄(m)—NH—SO₂—C₆H₄(3-NH₂) | (184) |
| 82 | 2,5-disulfo-phenyl—NH—SO₂—C₆H₄—NH₂ | (185) |
| 83 | 5,7-disulfo-naphthalen-2-yl—NH—SO₂—C₆H₄(3-NH₂) | (186) |
| 84 | 3,5-disulfo-naphthalen-7-yl—NH—SO₂—C₆H₄(3-NH₂) | (187) |
| 85 | 1,5-disulfo-naphthalen-7-yl—NH—SO₂—C₆H₄(3-NH₂) | (188) |
| 86 | 6-sulfo-3-sulfo-naphthalen-2-yl—NH—SO₂—C₆H₄(3-NH₂) | (189) |
| 87 | 3,6-disulfo-naphthalen-1-yl—NH—SO₂—C₆H₄(3-NH₂) | (190) |
| 88 | 5,8-disulfo-naphthalen-4-yl—NH—SO₂—C₆H₄(3-NH₂) | (191) |
| 89 | 5,7-disulfo-naphthalen-1-yl—NH—SO₂—C₆H₄(3-NH₂) | (192) |
| 90 | 5,8-disulfo-naphthalen-1-yl—NH—SO₂—C₆H₄(3-NH₂) | (193) |
| 91 | 5,7-disulfo-naphthalen-4-yl—NH—SO₂—C₆H₄(3-NH₂) | (194) |
| 92 | 4-chloro-3-sulfo-phenyl—NH—SO₂—C₆H₃(2-Cl)(3-NH₂) | (195) |
| 93 | 4-chloro-2-sulfo-phenyl—NH—SO₂—C₆H₃(2-Cl)(3-NH₂) | (196) |
| 94 | 4-chloro-2-sulfo-phenyl—NH—SO₂—C₆H₃(2-Cl)(3-NH₂) | (197) |
| 95 | 2,4-disulfo-phenyl—NH—SO₂—C₆H₃(2-Cl)(3-NH₂) | (198) |

TABLE-continued

| Ex. | Amine | |
|---|---|---|
| 96 | 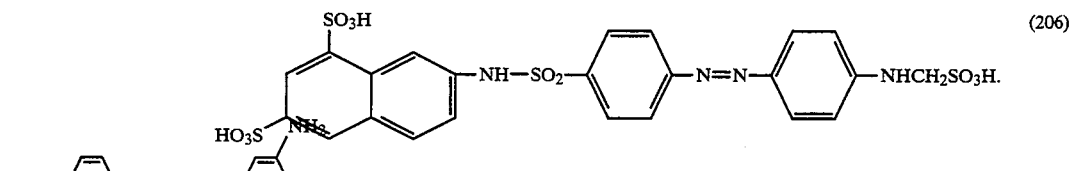 | (199) |
| 97 | | (200) |
| 98 | HO₃S—⟨⟩—NH—SO₂—⟨⟩—NH₂ with CH₃, Cl | (201) |
| 99 | naphthalene with SO₃H, SO₃H, NH—SO₂—⟨⟩—NH₂, Cl | (202) |
| 100 | naphthalene with SO₃H, HO₃S, NH—SO₂—⟨⟩—NH₂, Cl | (203) |
| 101 | HO₃S—naphthalene—NH—SO₂—⟨⟩—NH₂, Cl, SO₃H | (204) |

EXAMPLE 102

45.8 parts of a compound which in the form of the free acid conforms to the formula (205)

are dissolved in 160 parts of water at pH 7 with concentrated aqueous sodium hydroxide solution, 25 parts of approximately 32% hydrochloric acid solution are added and the mixture is cooled down to 2° C. Then 25 parts of 4N sodium nitrite solution are added dropwise and the suspension is stirred for one hour. 18.7 parts of anilino-methane sulfonic acid are added and a pH of 6-7 is set with 15 parts of sodium hydrogen carbonate. This leaves 290 parts of a solution containing a compound which in the form of free acid conforms to the formula

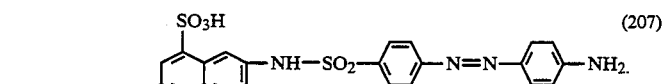

(206)

To the solution obtained as given above 50 parts of concentrated aqueous sodium hydroxide solution are added and the solution is heated at the boil for 90 minutes. After cooling down to room temperature, a pH of about 6 is set up with approximately 32% hydrochloric acid solution and 21 parts of sodium chloride are added. The precipitated product is filtered off, washed with a 20% sodium chloride solution and dried under reduced pressure at a temperature of from 50° to 60° C. This leaves 44.8 parts of a reaction product which in the form of the free acid conforms to the formula (207)

11.24 parts of the compound of formula (207) obtained as described above are dissolved in 100 parts of water at a neutral pH and 5 parts of 4N sodium nitrite solution are added. The solution is added dropwise to a mixture of 100 parts of ice and 5 parts of approximately 32% hydrochloric acid solution. The reaction mixture is then stirred for about 60 minutes and added dropwise to a solution prepared beforehand by dissolving 2.9 parts of 2-naphthol in 100 parts of water in the presence of 10 parts of 2N sodium hydroxide solution and 2.12 parts of sodium carbonate and then cooling to a temperature of about 2° C. Then the reaction mixture is stirred for about 17 hours. After addition of 8.5 parts of sodium chloride the precipitated dye is filtered off, washed with dilute aqueous sodium chloride solution and dried under reduced pressure at a temperature of from 50° to 60° C. This leaves 14 parts of a dye which in the form of the free acid conforms to the formula

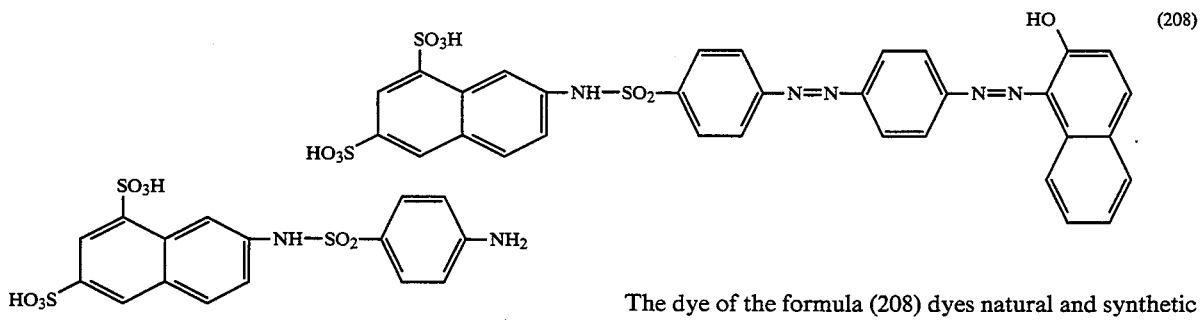

(208)

The dye of the formula (208) dyes natural and synthetic polyamide and leather in red shades.

EXAMPLES 103 TO 125

The procedure described in Example 102 is repeated, except that the 45.8 parts of the compound of the formula (205) are replaced by an equimolar amount of one of the amines shown below in column 2 of the Table 2 in the form of the free acid, affording similar dyes which dye natural and synthetic polyamide and leather in red shades.

TABLE 2

| Ex. | Amine | |
|---|---|---|
| 103 | [2-OCH₃, 5-HO₃S-C₆H₃-NH-SO₂-C₆H₄-NH₂ (para)] | (213) |
| 104 | [2-OCH₃, 5-HO₃S-C₆H₃-NH-SO₂-C₆H₄-NH₂ (meta-NH₂)] | (214) |
| 105 | [2-OCH₃, 5-HO₃S-C₆H₃-NH-SO₂-C₆H₃(Cl)(NH₂)] | (215) |
| 106 | [2,5-(HO₃S)₂-C₆H₃-NH-SO₂-C₆H₄-NH₂] | (216) |
| 107 | [HO₃S, SO₃H-naphthyl-NH-SO₂-C₆H₄-NH₂] | (217) |
| 108 | [(SO₃H)₂-naphthyl-NH-SO₂-C₆H₄-NH₂] | (218) |
| 109 | [(SO₃H)₂-naphthyl-NH-SO₂-C₆H₃(Cl)(NH₂)] | (219) |
| 110 | [HO₃S-C₆H₄-NH-SO₂-C₆H₄-NH₂ (ortho)] | (220) |
| 111 | [3-HO₃S-C₆H₄-NH-SO₂-C₆H₄-NH₂ (ortho)] | (221) |
| 112 | [HO₃S-C₆H₄-N(CH₃)-SO₂-C₆H₄-NH₂ (ortho)] | (222) |
| 113 | [3-HO₃S-C₆H₄-N(CH₃)-SO₂-C₆H₄-NH₂ (ortho)] | (223) |
| 114 | [Cl, HO₃S-C₆H₃-NH-SO₂-C₆H₄-NH₂ (ortho)] | (224) |
| 115 | [Cl, HO₃S-C₆H₃-N(CH₃)-SO₂-C₆H₄-NH₂ (ortho)] | (225) |
| 116 | [CH₃, HO₃S-C₆H₃-NH-SO₂-C₆H₄-NH₂ (ortho)] | (226) |
| 117 | [CH₃, HO₃S-C₆H₃-N(CH₃)-SO₂-C₆H₄-NH₂ (ortho)] | (227) |
| 118 | [OCH₃, HO₃S-C₆H₃-NH-SO₂-C₆H₄-NH₂ (ortho)] | (228) |
| 119 | [OCH₃, HO₃S-C₆H₃-N(CH₃)-SO₂-C₆H₄-NH₂ (ortho)] | (229) |
| 120 | [HO₃S, SO₃H-naphthyl-NH-SO₂-C₆H₄-NH₂ (ortho)] | (230) |
| 121 | [HO₃S, SO₃H-naphthyl-N(CH₃)-SO₂-C₆H₄-NH₂ (ortho)] | (231) |
| 122 | [(SO₃H)₂-naphthyl-NH-SO₂-C₆H₄-NH₂ (ortho)] | (232) |
| 123 | [(SO₃H)₂-naphthyl-N(CH₃)-SO₂-C₆H₄-NH₂ (ortho)] | (233) |

TABLE 2-continued

| Ex. | Amine | |
|---|---|---|
| 124 | 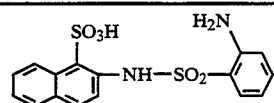 | (234) |
| 125 |  | (235) |

EXAMPLE 126 a) 37.95 parts of aniline-2,5-disulfonic acid are reacted in 100 parts of water with 3-nitrobenzenesulfonylchloride at a pH of from 4 to 7. This leaves a solution containing the compounds of formulae (236), (237) and (238) in a ratio of approximately 3:1:1, which in the form of the free acid conform to the formulae:

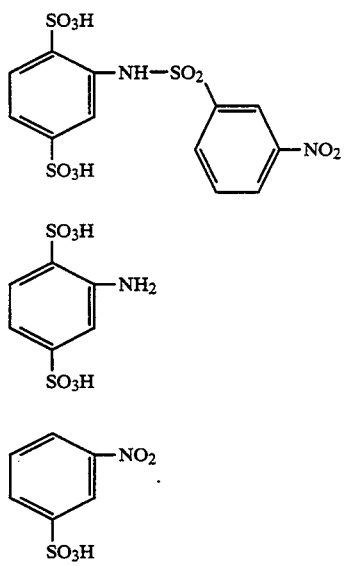

(236)

(237)

(238)

According to known methods the solution obtained as described above is reduced with iron powder to a solution containing the amines of formulae (239), (237) and (240) in a ratio of approximately 3:1:1, which in the form of the free acid conform to the formulae:

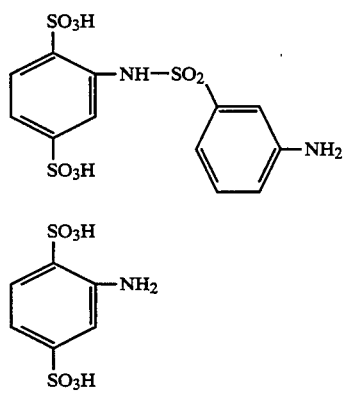

(239)

(237)

(240)

To 75 parts of the solution obtained 12.5 parts of approximately 32% hydrochloric acid solution are added and diazotisation is carried out at a temperature of 2° to 5° C. by addition of 12.5 parts of 4N sodium nitrite solution. Then 9.35 parts of anilino-methane sulfonic acid are added and a pH of 7 is set up by addition of 9 parts of sodium hydrogen carbonate. This leaves 140 parts of a solution containing the compounds of formulae (241), (242) and (243) in a ratio of approximately 3:1:1, which in the form of the free acid conform to the formulae:

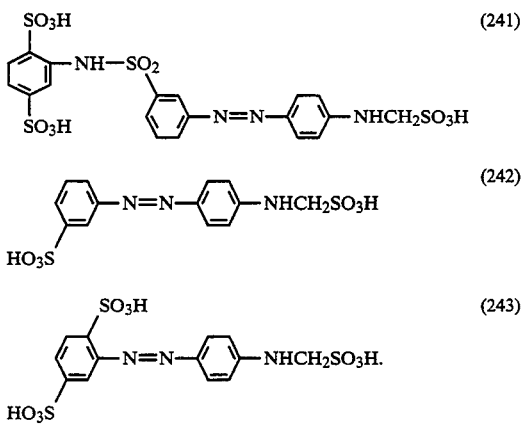

(241)

(242)

(243)

To the solution thus obtained 35 parts of concentrated aqueous sodium hydroxide solution are added and the solution is heated at the boil for 90 minutes. After cooling down to room temperature a pH of 6.6 is set up by addition of 35 parts of approximately 32% hydrochloric acid solution. Then 30 parts of sodium chloride are added, the precipitated product is filtered off and washed with diluted sodium chloride solution. This leaves 50 parts of a moist filter cake containing the compounds of formulae (244) and (245) in a ratio of approximately 2:1, which in the form of the free acid conform to the formulae:

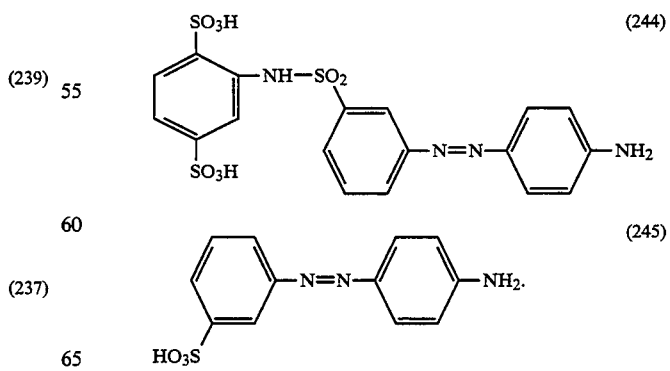

(244)

(245)

The reaction product of the compound of formula (243) remains in the filtrate.

b) 50 parts of the moist filter cake obtained according to step a) are stirred into 100 parts of water and 10 parts of approximately 32% hydrochloric acid solution are added. Then diazotisation is carried out by addition of 6 parts of 4N sodium nitrite solution and the suspension of the diazo compound is stirred for 30 minutes at room temperature. The suspension thus obtained is added at a pH of 9-10 to a solution prepared beforehand by dissolving 3.45 parts of 2-naphthol in 100 parts of water in the presence of 12 parts of 2N sodium hydroxide solution, keeping the pH at a value of 9-10 by addition of diluted sodium hydroxide solution. After addition of 48 parts of sodium chloride the precipitated dye is filtered off at a pH of 8, washed with dilute aqueous sodium chloride solution and dried under reduced pressure at a temperature of from 50° to 60° C. This leaves 12.8 parts of a dye mixture containing the dyes of the formulae (246) and (247) which in the form of the free acid conform to the formulae

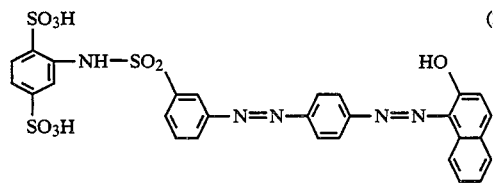
(246)

and

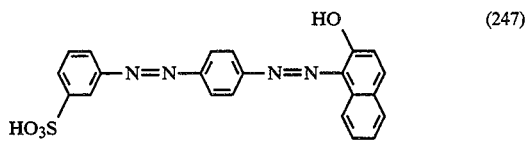
(247)

in a ratio of about 2:1. The dye mixture of the dyes of the formulae (246) and (247) dyes natural and synthetic polyamide and leather in red shades.

Similar dye mixtures containing the dyes of formulae

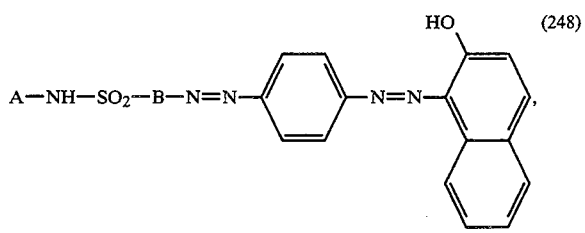
(248)

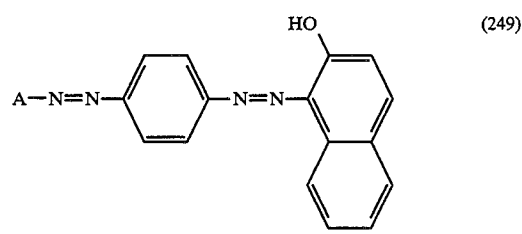
(249)

and

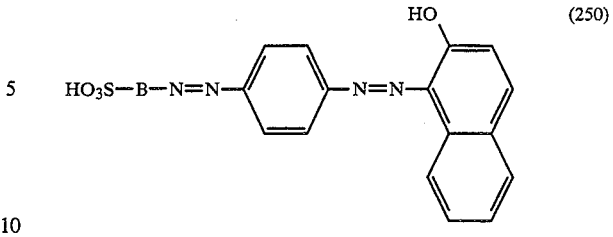
(250)

can be obtained by repeating the procedure of Example 126, except that in step a) of Example 126 the 37.95 parts of aniline-2,5-disulfonic acid are replaced by an equimolar amount of a compound of formula $A\text{-}NH_2$ and the 33.23 parts of 3-nitro-benzenesulfonylchloride are replaced by an equimolar amount of a compound of formula $NO_2\text{—}B\text{—}SO_2Cl$, taking the appropriate compounds of formulae $A\text{—}NH_2$ and $NO_2\text{—}B\text{—}SO_2Cl$ that are necessary for the preparation of the amines of Examples 103 to 111, 114, 116, 118, 120, 122 or 124.

Based on the solubility the dyes of formulae (249) and/or (250), or one of the precursors of these dyes, can remain in the filtrate after filtration. In this case the filter cake only contains the dye of formula (248) or a mixture of the dyes of formulae (248) and (249) or a mixture of the dyes of formulae (248) and (250). The mixture of dyes obtainable after filtration and drying dye natural and synthetic polyamide and leather in red shades.

Dyeing method I 10 parts of nylon-6.6 fabric are dyed in 500 parts of an aqueous liquor containing 2 g/l of ammonium acetate, adjusted to pH 5 with acetic acid. The proportion of dye of Example 1 is 0.7% on weight of fibre. The dyeing time at a temperature of 98° is 30 to 90 minutes. The dyed nylon-6.6 fabric is then removed and washed and dried as usual.

The result obtained is a red nylon-6.6 fabric which has a clean shade and good all round fastness properties.

Dyeing method II 10 parts of nylon-6.6 fabric are dyed in 500 parts of an aqueous liquor containing 1 g/l of monosodium phosphate, adjusted to pH 6 with disodium phosphate. The proportion of dye of Example 3 is 1% on weight of fibre. The dyeing time at a temperature of 98° is 30 to 90 minutes. The dyed nylon-6.6 fabric is then removed and washed and dried as usual.

The result obtained is a red nylon-6.6 fabric which has a clean shade and good all round fastness properties.

Dyeing method III 10 parts of wool piece goods are dyed in 500 parts of an aqueous liquor. On weight of fibre the proportion of dye of Example 1 is 0.45%, the proportion of calcined Glauber salt is 5% and the proportion of 80% acetic acid is 2%. The dyeing time at a temperature of 98° is 30-60 minutes. After conventional washing and drying, the red-dyed wool piece has very good all round fastness properties.

Dyeing method IV 100 parts of apparel suede leather are drummed at 50° in a solution of 1000 parts of water and 2 parts of 24% ammonia for 2 hours and then dyed at 60° in a solution of 1000 parts of water, 2 parts of 24% ammonia and 3 parts of dye of Example 1 for 1 hour. Thereafter a solution of 40 parts of water and 4 parts of 85% formic acid is added and the dyeing is continued for a further 30 minutes. The leather is then thoroughly rinsed and if necessary additionally treated with 2 parts of a dicyandiamide-formaldehyde condensation product at 50° for 30 minutes. The red dyeing obtained has good fastness properties.

Printing method (fabric print)

Woven nylon-6 or nylon-6.6 material is printed on a conventional textile printing machine with a print paste containing per 1000 g:
a) 20 g of the dye of Example 1,
b) 50 g of urea,
c) 50 g of thiodiethylene glycol,
d) 320 g of water,
e) 500 g of 10% bean gum or guar flour derivative, and
f) 60 g of 15 Bè ammonium tartrate solution.

The printed material is dried in a drying cabinet at 70° to 80° and then steamed with saturated steam at 101° to 103° for 20 to 30 minutes. The material is then rinsed cold for 10 minutes, washed at 50° to 60° with 2 g/l of synthetic detergent for 15 minutes, again rinsed cold and then dried. This gives a level print having a red shade, crisp outlines and good fastness properties.

To assess the state of fine division, the print paste is applied in dilute form. The printed material is found to be speckle-free.

What is claimed is:

1. An azo dye of the formula

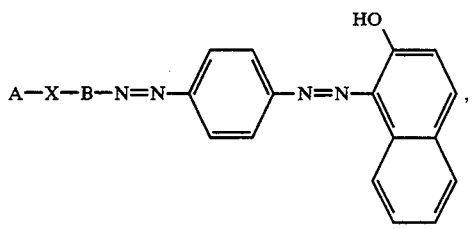

wherein

A is unsubstituted phenyl or naphthyl, or is phenyl or naphthyl, each of which is substituted by one or more of the substituents selected from the group consisting of $C_1$-$C_8$alkyl, $C_1$-$C_8$alkoxy, $C_2$-$C_8$alkanoylamino, $C_2$-$C_8$alkoxycarbonylamino, $C_2$-$C_8$alkanoyl, nitro, cyano, trifluoromethyl, chlorine, fluorine, bromine, carbamoyl, sulfamoyl, ureido, hydroxyl, carboxyl, sulfo, sulfato, unsubstituted phenylaminosulfonyl and naphthylaminosulfonyl, and phenylaminosulfonyl or naphthylaminosulfonyl, each of which is substituted by one or more of the substituents selected from the group consisting of $C_1$-$C_8$alkyl, $C_1$-$C_8$alkoxy, chlorine, fluorine, bromine, carboxy and sulfo; B is unsubstituted phenyl or is phenyl which is substituted by one or more of the substituents selected from the group consisting of $C_1$-$C_4$alkyl, $C_1$-$C_4$alkoxy, chlorine, fluorine, bromine, carboxyl and sulfo; and X is —N($R_1$)—$SO_2$—, —O—$SO_2$— or —$SO_2$—N($R_1$)—, where $R_1$ is hydrogen or $C_1$-$C_8$alkyl.

2. An azo dye according to claim 1, wherein A is unsubstituted phenyl or naphthyl, or phenyl or naphthyl, each of which is substituted by one or more substituents selected from the group consisting of $C_1$-$C_8$alkyl, $C_1$-$C_8$alkoxy, chlorine, fluorine, bromine, carboxyl, sulfo, unsubstituted phenylaminosulfonyl or naphthylaminosulfonyl, and phenylaminosulfonyl or naphthylaminosulfonyl, each of which is substituted by one or more substituents selected from the group consisting of $C_1$-$C_8$alkyl, $C_1$-$C_8$alkoxy, chlorine, fluorine, bromine, carboxyl or sulfo.

3. An azo dye according to claim 1, wherein A is unsubstituted phenyl or phenyl which is substituted by $C_1$-$C_4$alkyl, $C_1$-$C_4$alkoxy, chlorine, fluorine, bromine, carboxyl, sulfo, unsubstituted phenylaminosulfonyl or naphthylaminosulfonyl, or phenylaminosulfonyl or naphthylaminosulfonyl, each of which is further substituted by $C_1$-$C_8$alkyl, $C_1$-$C_8$alkoxy, chlorine, fluorine, bromine, carboxyl or sulfo.

4. An azo dye according to claim 1, wherein the dye of the formula (1) contains only one or two sulfo groups.

5. An azo dye according to claim 1, wherein X is —N($R_1$)—$SO_2$— and $R_1$ is hydrogen or $C_1$-$C_4$alkyl.

6. An azo dye according to claim 1 of the formula

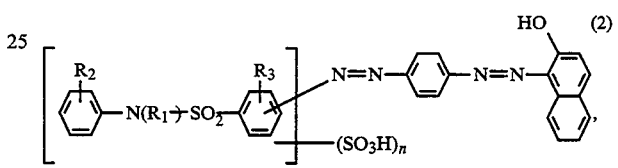

where $R_1$ is hydrogen or $C_1$-$C_4$alkyl, $R_2$ is $C_1$-$C_4$alkyl, $C_1$-$C_4$alkoxy, chlorine, fluorine, bromine, carboxyl, unsubstituted phenylaminosulfonyl or naphthylaminosulfonyl, or phenylaminosulfonyl or naphthylaminosulfonyl, each of which is substituted by sulfo, $R_3$ is $C_1$-$C_4$alkyl, $C_1$-$C_4$alkoxy, chlorine, fluorine, bromine or carboxyl, and n is 1 or 2.

7. An azo dye according to claim 1 of the formula

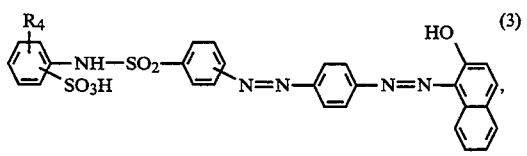

where $R_4$ is hydrogen or methyl.

8. An azo dye according to claim 4, wherein the dye of the formula (1) contains only one sulfo group.

9. An azo dye according to claim 5, wherein $R_1$ is hydrogen.

10. An azo dye according to claim 6, wherein $R_1$ is hydrogen.

11. An azo dye according to claim 7, wherein $R_1$ is hydrogen.

12. An azo dye according to claim 1, of the formula

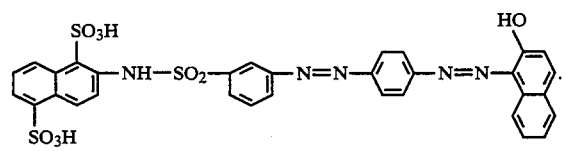

13. An azo dye according to claim 1, of the formula

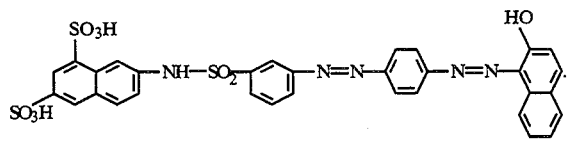
14. An azo dye according to claim 1, of the formula
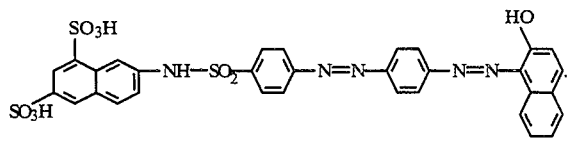
* * * * *